United States Patent

Morishita et al.

[11] Patent Number: 4,554,474
[45] Date of Patent: Nov. 19, 1985

[54] STATOR FOR A MAGNET MOTOR

[75] Inventors: Akira Morishita; Kyoichi Okamoto, both of Himeji, Japan

[73] Assignee: Mitsubishi Denki Kabushiki Kaisha, Tokyo, Japan

[21] Appl. No.: 619,988

[22] Filed: Jun. 12, 1984

[30] Foreign Application Priority Data

Jul. 7, 1983 [JP] Japan .................. 58-106090[U]

[51] Int. Cl.[4] ............................................ H02K 21/26
[52] U.S. Cl. ...................................... 310/154; 310/254
[58] Field of Search ................. 310/152, 154, 181, 254

[56] References Cited

U.S. PATENT DOCUMENTS

| | | | |
|---|---|---|---|
| 3,567,979 | 3/1971 | Jaffe et al. | 310/154 X |
| 3,594,599 | 9/1984 | West . | |
| 3,939,371 | 2/1976 | Murakami | 310/154 |
| 4,110,718 | 8/1978 | Odor et al. | 310/154 X |
| 4,112,320 | 9/1978 | Mohr | 310/154 |
| 4,237,397 | 12/1980 | Mohr | 310/154 |
| 4,383,193 | 5/1983 | Tomite et al. | 310/154 |
| 4,469,969 | 9/1984 | Tomite | 310/154 |
| 4,471,252 | 9/1984 | West | 310/154 |

FOREIGN PATENT DOCUMENTS 0096868 12/1983 European Pat. Off. .
2268377 11/1978 France .
1277876 6/1972 United Kingdom .

Primary Examiner—Donovan F. Duggan
Attorney, Agent, or Firm—Oblon, Fisher, Spivak, McClelland & Maier

[57] ABSTRACT

A stator for a magnetic motor comprising a cylindrical yoke, at least one pair of main magnetic poles formed of permanent magnets fixed to the inner peripheral surface of the yoke, at least one pair of auxiliary magnetic poles made of a soft iron material each placed at a side portion of each of the main magnetic poles, wherein an air gap formed between the inner peripheral surface of each of the main magnetic poles and the outer peripheral surface of an armature rotatably placed at the axial center of the yoke is made greater than an air gap formed between the inner peripheral surface of each of the auxiliary magnetic poles and the outer peripheral surface of the armature.

4 Claims, 2 Drawing Figures

STATOR FOR A MAGNET MOTOR

The present invention relates to a stator for a magnet motor. More particularly, it relates to an improvement in a stator for a magnet motor comprising main magnetic poles made of permanent magnet material and auxiliary magnetic poles made of soft iron.

Figure 1:
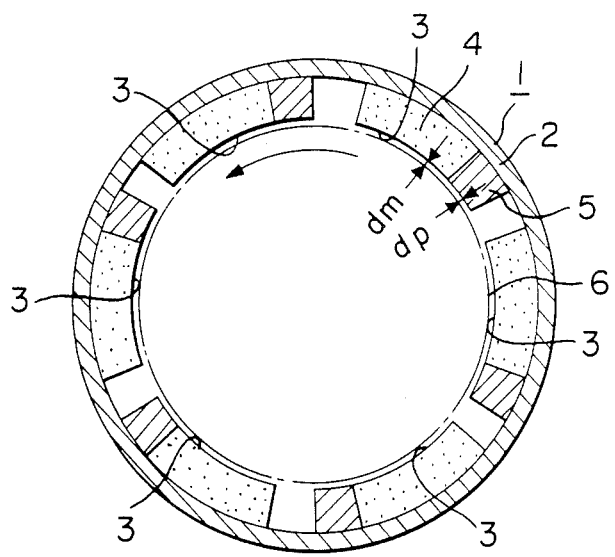

As this type of a magnet motor, there has so far been known one as shown in FIG. 1.

In FIG. 1, a reference numeral 1 designates a stator for a magnet motor which is constituted by a cylindrical yoke 2 formed of a soft iron plate, main magnetic poles 4 made of ferrite permanent magnet material attached to the inner peripheral surface of the yoke 2 and auxiliary magnetic poles 5 made of a soft iron strip material each arranged at one side end part of each of the main magnetic poles 4 and secured to the inner peripheral surface of the yoke 2 by welding operation. Field magnetic poles 3 constituted by each one of the main and auxiliary magnetic poles 4, 5 are equidistantly arranged at six positions on the inner peripheral surface of the yoke 2 to thereby provide six pole stator. The main magnetic poles 4 are formed by magnetizing ferrite to be permanent magnets. An armature 6 is placed in a space around of which the field magnetic poles 3 are arranged in a freely rotatable manner so that there are formed an air gap dm between the outer peripheral surface of the armature 6 and the inner peripheral surface of each of the main magnetic poles 4 and an air gap dp between the outer peripheral surface of the armature 6 and the inner peripheral surface of each of the auxiliary magnetic poles 5 to have relationship of dm=dp. Further, each of the auxiliary magnetic poles 5 is placed at the rear end side of each of the main magnetic poles 4 with respect to the direction of revolution of the armature 6, namely at the side of increased magnetic flux caused by armature reaction.

Description of the operation of the magnet motor having the above-mentioned construction is omitted because of its being well known.

The conventional magnet motor has a disadvantage that when a bearing (not shown) supporting the armature 6 is worn by a long term use to cause eccentric revolution of the armature 6, the outer peripheral surface of the armature comes in contact with the field magnetic poles 3 to result in breakage of the main magnetic poles 4 made of fragile ferrite permanent magnetic material to thereby invite destruction of the magnet motor.

It is an object of the present invention to eliminate the disadvantage of the conventional magnet motor and to provide a magnet motor of highly reliable and difficult to cause destruction of the main magnetic poles even in eccentric revolution of the armature by constructing it such that an air gap formed between a main magnetic pole and an armature is greater than an air gap formed between an auxiliary magnetic pole and the armature.

The foregoing and the other objects of the present invention have been attained by providing a stator for a magnet motor comprising a cylindrical yoke, at least one pair of main magnetic poles formed of permanent magnets fixed to the inner peripheral surface of the yoke, at least one pair of auxiliary magnetic poles made of a soft iron material each placed at a side poriton of each of the main magnetic poles, characterized in that an air gap formed between the inner peripheral surface of each of the main magnetic poles and the outer peripheral surface of an armature rotatably placed at the axial center of the yoke is made greater than an air gap formed between the inner peripheral surface of each of the auxiliary magnetic poles and the outer pheripheral surface of the armature.

Figure 2:
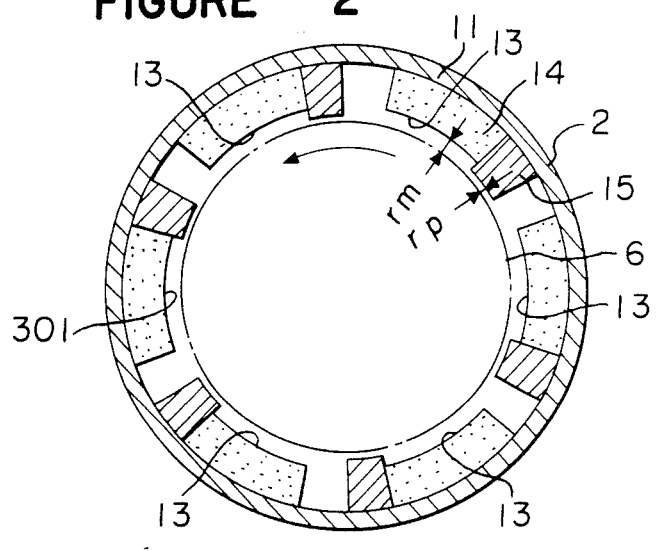

A more complete appreciation of the invention and many of the attendant advantages thereof will be readily obtained as the same becomes better understood by reference to the following detailed description when considered in connection with the accompanying drawings, wherein:

FIG. 1 is a cross sectional view of a conventional stator for a magnet motor; and FIG. 2 is a cross sectional view of an embodiment of the stator for a magnet motor according to the present invention.

An embodiment of the present invention will be described with reference to FIG. 2.

In FIG. 2, a reference numeral 11 designates the stator of a magnet motor; a numeral 13 designates field magnetic poles and a numeral 14 designates main magnetic poles made of ferrite permanent magnetic material. Between the inner peripheral surface of each of the main magnetic poles 4 and the outer peripheral surface of the armature 6, an air gap rm is formed. Auxiliary magnetic poles 15 made of a soft iron strip material are secured to the inner peripheral surface of the yoke 2 by spot-welding and thereafter, the inner peripheral surface 15a of the auxiliary magnetic poles is precisely machined to form an air gap rp between the inner peripheral surface 15a and the outer peripheral surface of the armature 6. The air gaps rm and rp are formed to have relationship:

$$rm > rp \qquad (1)$$

$$rm - rp \leq 0.3 \text{ mm} \qquad (2)$$

The construction of the stator of this embodiment is the same as that of the conventional one as shown in FIG. 1 except for the structure as above-mentioned and therefore, description is omitted.

With the construction as above mentioned, even when revolution of the armature 6 around its revolution axis becomes inaccurate due to, for example, wearing of the bearing, the outer peripheral surface of the armature 6 comes firstly in contact with the inner peripheral surface of any of the auxiliary magnetic poles to thereby prevent sliding contact or striking of the armature 6 to the inner peripheral surface of the main magnetic poles 14; thus, possibility of the breakage of the main magnetic poles 14 is reduced. It is preferable that the air gaps rm, rp have the relationship as in the equation (2) in view of practical use.

FIG. 2 shows that the height of the main magnetic poles is lower than that of the conventional ones. However, the reduced dimension is very slight such as 0.3 mm or less and accordingly, there is no adverse effect to the magnetic characteristic of the magnet motor of the present invention.

In the embodiment as above mentioned, the auxiliary magnetic poles are separately prepared and attached to the yoke; however, the same effect can be obtained by forming the auxiliary magnetic poles integrally with the yoke so as to project toward the center of the yoke.

As described above, the stator of the present invention is constructed in such a manner that an air gap between the outer peripheral surface of the armature and the inner peripheral surface of the main magnetic poles is greater than an air gap between the outer peripheral surface of the armature and the inner peripheral surface of the auxiliary magnetic poles whereby there is obtainable the stator of a magnetic motor which does not cause breakage of the main magnetic poles to be highly reliable and is easily manufactured at a low cost.

Obviously, numerous modifications and variations of the present invention are possible in light of the above teachings. It is therefore to be understood that within the scope of the appended claims, the invention may be practiced otherwise than as specifically described herein.

We claim:

1. A stator for a magnetic motor comprising a cylindrical yoke, at least one pair of main magnetic poles formed of permanent magnets fixed to the inner peripheral surface of said yoke, at least one pair of auxiliary magnetic poles made of a soft iron material each placed at a side portion of each of said main magnetic poles, characterized in that an air gap formed between the inner peripheral surface of each of said main magnetic poles and the outer peripheral surface of an armature rotatably placed at the axial center of said yoke is made greater than an air gap formed between the inner peripheral surface of each of said auxiliary magnetic poles and the outer peripheral surface of said armature.

2. The stator for a magnet motor according to claim 1, wherein said main magnetic poles are constituted by ferrite permanent magnet material.

3. The stator for a magnet motor according to claim 1, wherein said air gap (rm) formed between the inner peripheral surface of said main magnetic pole and the outer peripheral surface of said armature and said air gap (rp) formed between the inner peripheral surface of said auxiliary magnetic pole and the outer peripheral surface of said armature has relationship of $rm > rp$ and $rm - rp \leqq 0.3$ mm.

4. The stator for a magnet motor according to claim 1, wherein each of said auxiliary magnetic poles is placed at the rear end side of each of said main magnetic poles with respect to the direction of revolution of said armature.

* * * * *